June 25, 1935. H. A. THAM 2,006,121

PROFILING ATTACHMENT FOR PLANERS

Filed Jan. 23, 1935

Inventor,
Howard A. Tham,
By Robert M. Pierson,
Attorney

UNITED STATES PATENT OFFICE 2,006,121

PROFILING ATTACHMENT FOR PLANERS

Howard A. Tham, Akron, Ohio, assignor to The Mechanical Mold & Machine Company, Akron, Ohio, a corporation of Ohio Application January 23, 1935, Serial No. 2,979

13 Claims. (Cl. 90—24.3)

This invention, relating to metal planing machines, has for its object to provide improved means for making profile cuts, that is, those which vary in their course from the ordinary straight cuts parallel with the motion of the work table.

The invention may conveniently be embodied as an attachment, permitting the use of an existing machine for profiling work, or allowing its use as an ordinary planer by disabling or removal of certain parts of the attachment. It provides improved means for varying the regular straight-line cuts in a horizontal plane or in both horizontal and vertical planes, and permits the automatic cutting on a planer of a variety of elongated forms, such as certain classes of vulcanizing molds including those for molding the rubber on metallic running boards for automobiles. The improved apparatus is direct-acting, simpler, less expensive, easier to maintain and more accurate than automatic planer profiling devices heretofore proposed.

This application is a continuation in part of my prior application Serial No. 743,379, filed September 10, 1934.

Of the accompanying drawing, Fig. 1 is a partial front elevation and vertical section showing a familiar type of open-side planer provided with a preferred embodiment of my invention.

Figure 1:
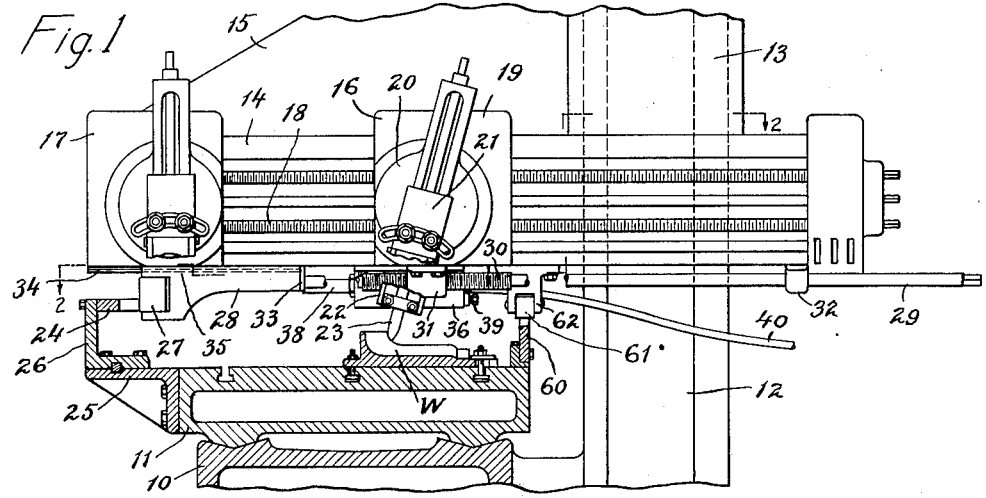
Figure 2:
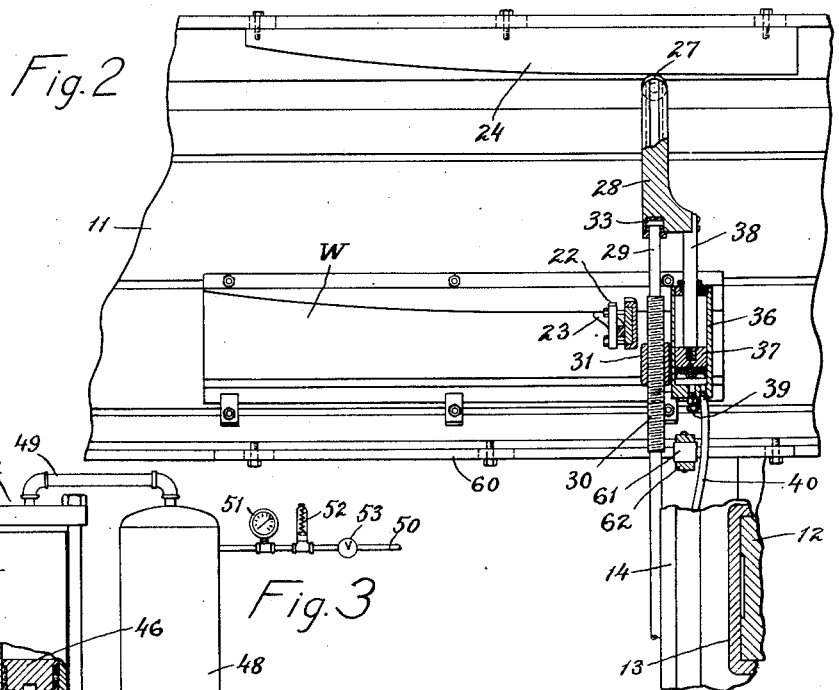
Fig. 2 is a plan and horizontal section in several planes, indicated approximately by the line 2—2 of Fig. 1.
Figure 3:
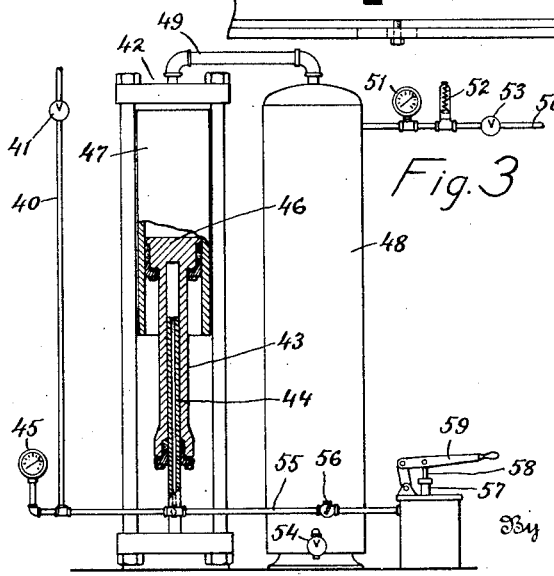
Fig. 3 is a side elevation, partly in section, showing the preferred accumulator device and connections.

In the drawing, 10 is the planer bed having mounted thereon the usual work table 11, to which horizontal reciprocating movement is imparted by the ordinary means, the planer shown being of the open-side, single-column type. 12 is the column having vertical guides for the slide 13 which carries the horizontal rail 14, and 15 is the thrust-resisting knee forming part of said slide. The usual vertical-traverse feed (not shown) is provided for setting the rail with its cutting tool or tools at the desired height above the work table.

The rail 14 is provided with one or more tool heads, of which the head 16 is mounted and controlled in accordance with my invention for making profile cuts. 17 is the regular left-hand tool head whose horizontal position on the rail 14 is controlled by a lower cross-feed screw 18. The head 16 includes the usual saddle 19 horizontally slidable on the guides of the rail 14, and a tool support including an angularly-adjustable harp 20, radial slide 21 thereon and angularly-adjustable, slide-supported clamping holder 22 for the planing tool 23. W represents a partly shaped work blank, such as a running board mold member, secured by T-bolts on the table 11.

The horizontal position of the head 16 and hence of its cutting tool 23 is automatically controlled by an elongated cam plate 24 detachably mounted at the left-hand edge of the work table 11 on the upper one of a pair of superposed supporting brackets 25, 26. While this provides the simplest mounting and resulting tool-head movement, the arrangement is not necessarily restricted to a fixed cam support on the table. 27 is a thrust roller acting as a rider or follower against the cam plate 24 and carried on a pin in the clevis of a roller holder 28 which is adjustably connected with the tool head 16. The connection is made by a horizontal rod 29 having a screw portion 30 which turns in a nut 31 fastened to the bottom edge of the tool-head saddle 19, said rod being further supported in a bearing 32 near the right-hand end of the rail. The left-hand end of the rod 29 has a swivel connection 33 with the roller holder 28, so that it may turn on said holder. The roller holder 28 is slidingly supported from the lower edge of the tool head 17 by means of a dovetail guide 34 on the head interfitted with a complemental guide member 35 on the holder. The screw rods 18 and 29 have squared right-hand ends for the application of a turning wrench and could be provided with any suitable indexing device.

A continuous or constantly-acting hydraulic thrust pressure, transmitted through a normally-open pipe line in a non-circulating or non-return, closed hydraulic system—as distinguished from circulating pump systems employing intermittent pressure with automatic valve control—is yieldingly exerted upon the cam follower through the cylinder 36 of a single-acting horizontal ram which is fixed on the under side of the rail 14. Said cylinder has a piston 37 whose rod 38 connects directly with the roller holder 28 to relieve the adjusting nut 31 from the ram pressure.

The preferred arrangement is that shown, wherein the horizontal cutting thrust is supplied by the hydraulic pressure and opposed by the cam, permitting the follower roller 27 to be readily backed away by means of the screw adjusting rod 29, or to be withdrawn when the attachment is not in use, as may be accomplished by shutting off the hydraulic supply and bleeding the cylinder 36 past an outlet screw valve 39 in the head thereof.

A liquid pressure medium such as oil is supplied to the ram cylinder 36 through a pipe 40 containing a manual stop valve 41 for shutting it off when desired, from a preferred type of accumulator designated generally at 42. This device includes tandem differential cylinders and pistons, of which the smaller couple comprises a vertically-movable, single-acting oil cylinder 43 and a stationary tubular piston or plunger 44 therein connecting at its lower end through a branch pipe with the ram supply pipe 40. On the pipe 40 is an oil pressure gauge 45. The larger couple comprises a compressed-air piston 46 carrying the oil cylinder 43 and working in a single-acting air cylinder 47.

48 is a compressed-air tank connecting with the cylinder 47 through a pipe 49 to provide a reservoir for moderating the small fluctuations of air pressure on the piston and in the closed tank, caused by movements of said piston. The tank 48 is supplied from a branch pipe 50 of a compressed-air line such as machine shops are commonly equipped with. Said pipe has an air-pressure gauge 51 and safety valve 52 and also contains a hand valve 53 which is normally closed except for occasional times when it may momentarily be opened to make up a leakage loss or for the purpose of increasing the air pressure to provide a larger hydraulic thrust. The tank pressure may be reduced when desired by opening a discharge valve 54.

For renewing losses of oil, caused by leakage or by one or more bleedings of the ram cylinder 36, there is connected with the oil line 40 through a branch 55, containing a check-valve 56, a pump 57 having a plunger 58 of such small diameter that it may be hand-operated by a lever 59, but the closed system will require only occasional use of this pump, which is not used as a circulating device.

When profile cuts are also to be made in the vertical plane, the vertical position of the rail 14 is automatically controlled by an elongated cam plate 60 detachably mounted at the right-hand edge of the work table 11 and coacting with a thrust roller or cam follower 61 carried by a bracket 62 detachably mounted on the lower edge of the rail 14, alongside of the column 12 in the zone of the thrust knee 15, so that the weight of the knee and rail are nearly centered over the roller. In working with this vertical control, the rail will be disconnected from its vertical-transverse feed, and the weight of the rail assembly allowed to furnish the thrust, partially counteracted by a counterweight if necessary. The horizontal cam roller 27 is vertically elongated to coordinate the action of the two cams upon the tool head and thus to permit concurrent operation of both horizontal and vertical controls for the position of the tool head 16.

In the operation of this apparatus, all of the ordinary straight-line planer cuts may be made with either or both of the tool heads 16 and 17 in action. If the head 16 is thus used for the ordinary cuts, its automatic cam control may be disabled in a suitable manner, as by removing the cam plate 24 and allowing the cross feed of the head to be manually controlled by the screw 29, while the oil pressure in the cylinder 36, holding the piston 37 at the limit of its outstroke, opposes the lateral cutting thrust. For making a cut whose course varies laterally from a straight line parallel with the feed movement of the table 11 and may be either straight-line diagonal or partly or wholly curved, the cam plate 24 is located at the left-hand edge of the table as shown in the drawing, and the oil pressure in the cylinder 36 will then cause the roller 27 to follow the profiled edge of the cam plate and correspondingly control the course of the cut through the movement imparted to head 16. Adjustment of the roller 27 with reference to the head 16 by means of the screw rod 29 permits an initial setting of the planing tool 23 in its most leftward position with reference to said roller. The oil from the accumulator 42 furnishes sufficient hydraulic pressure in the ram cylinder 36 to cause the roller 27 to follow the edge contour of the cam 24 against right-hand lateral thrust of the planing tool, but retracting movement imposed by the cam upon the roller is yieldingly permitted by partial return of the oil from the ram cylinder against the accumulator pressure.

Thus the horizontal feed of the tool is positively furnished by the cam in one direction, and the opposite movement is yieldingly caused by the direct thrust of the continuously-acting hydraulic ram without the intervention of valve control. The tool feed is thus accomplished smoothly, without chatter, in a much more satisfactory manner than by springs, weights or double-acting grooved cams. My invention is the first, so far as I am aware, successfully to apply hydraulic thrust to the control of horizontal tool feed in a planer.

Concurrently with the cam-controlled cross-feed movement of the tool head 16, the latter may also receive a vertical feed movement through the described action on the rail 14 of the table cam 60 and the rail roller 61, the vertical elongation of the roller 27 maintaining it in contact with the edge of the cam 24, so that profiling can be done in both planes; or if either cam and/or its follower is removed, the profiling will be done only in the corresponding other plane.

The force of the hydraulic thrust may easily and quickly be changed by varying the air pressure in the tank 48. If it is desired to use the machine as an ordinary planer for straight-line cuts only, the vertical cam 60 and/or roller 61 is removed, the horizontal cam 24 removed, and/or its roller 27 withdrawn by closing the valve 41 in the oil line 40, bleeding the ram cylinder 36 by opening its valve 39 and retracting the piston rod 38.

It will be understood that various changes of embodiment, omissions or additions may be effected without departing from the scope of my invention as defined in the claims.

I claim:

1. The combination of a planer having a horizontally reciprocating work table, a tool head movable transversely thereof, a cam movable with the table for positively actuating said head horizontally in one direction, a cam follower connected with the tool head, and hydraulic means continuously exerting a uni-directional thrust on said follower for yieldingly moving said head in the opposite direction, said means having a valve-controlled outlet for relieving the pressure.

2. Apparatus according to claim 1 in which cutting feed is imparted to the tool head by the hydraulic thrust means and is opposed by the pressure of the cam.

3. The combination, with a planing machine having a horizontally reciprocating work table and a tool head movable transversely thereof, of a profiling attachment comprising a cam carried by the table for positively imparting horizontal feed movement to said head in one direction, a cam follower connected with the head, and a hydraulic ram having a plunger acting on said follower in a direction parallel with the tool-head movement for yieldingly moving said head in the opposite direction, and also having valve means for relieving the hydraulic pressure, said cam being removable to permit the use of the machine for ordinary planing cuts.

4. The combination of a planer having a horizontally reciprocating work table and a tool head mounted for depth-feed and cross-feed movements, a table cam for imparting the cross-feed movement to said head in one direction, a single-acting hydraulic ram for imparting the opposite cross-feed movement to said head, and a pressure accumulator connected with said ram by a normally-open conduit for supplying working liquid to and receiving it from said ram.

5. Apparatus according to claim 4 in which the conduit is provided with a shut-off valve and the ram with a bleeder valve for disabling said ram.

6. Apparatus according to claim 4 including an accumulator of the differential-piston type adapted to maintain a high hydraulic pressure with a relatively-low compressed-air pressure, a reservoir tank on the air side of said accumulator, and valve means for varying the air pressure in said tank.

7. The combination of a planer having a reciprocating work table, a tool head movable transversely thereof, a cam carried by the table, a cam roller and holder therefor, thrust means yieldingly acting on said holder, and a rotary connecting and adjusting member interposed between said head and holder, said member having a screw connection with one of the latter and being swiveled to the other.

8. Apparatus according to claim 7 including a second tool head slidingly supporting the roller holder.

9. A profiling attachment for planers comprising a hydraulic ram for yieldingly imparting a cross-feed movement to the planer tool head in one direction, an elongated cam plate for mounting on the reciprocating work table of the planer to positively feed the head in the opposite direction, a cam roller and holder therefor, a screw rod having a swiveled connection with the roller holder, and a nut on said rod for mounting on the planer tool head.

10. The combination, in a planer, of a reciprocating work table, a vertically-adjustable guide rail having a tool head horizontally movable thereon, a table cam, a cam follower carried by the rail, a hydraulic ram comprising a single-acting cylinder mounted on the rail, a piston therein having a thrust-rod connection with the cam follower, and an adjustable connection between said follower and the tool head comprising a nut on one of said members, and a rod screwing in said nut and having a swivel connection with the other member.

11. The combination of a planer having a reciprocating work table, a vertically-movable rail, a tool head movable on the rail transversely of said table, a pair of cams carried by the table and respectively controlling the rail and tool head for imparting vertical and horizontal feed movements to said head, and means for coordinating the action of said cams upon the tool head to permit concurrent operation of the two feeds.

12. The combination of a planer having a reciprocating work table, a vertically movable rail, a cam on the table and a cam follower on the rail for controlling the latter's vertical movement, a tool head, means for yieldingly imparting horizontal movement to said tool head on the rail, a second cam on the table, and a roller follower for said second cam connected and horizontally movable with said head, and vertically elongated to maintain its contact with the second cam during vertical traverse of the rail.

13. The combination of an open-side planer having a single column and a reciprocating work table, a rail and associated thrust knee vertically movable on said column, a tool head movable on said rail transversely of the column, a vertically-acting cam carried by the table adjacent said column, a cam follower on the rail and knee structure in the zone of said knee, a horizontally-acting cam carried by the table at its outer edge, controlling the transverse feed of the tool head, and means coordinating the action of said cams upon the tool head to permit concurrent operation of the vertical and transverse feeds.

HOWARD A. THAM.